Aug. 9, 1949.    H. WIRZ    2,478,350
VALVE
Filed June 23, 1944
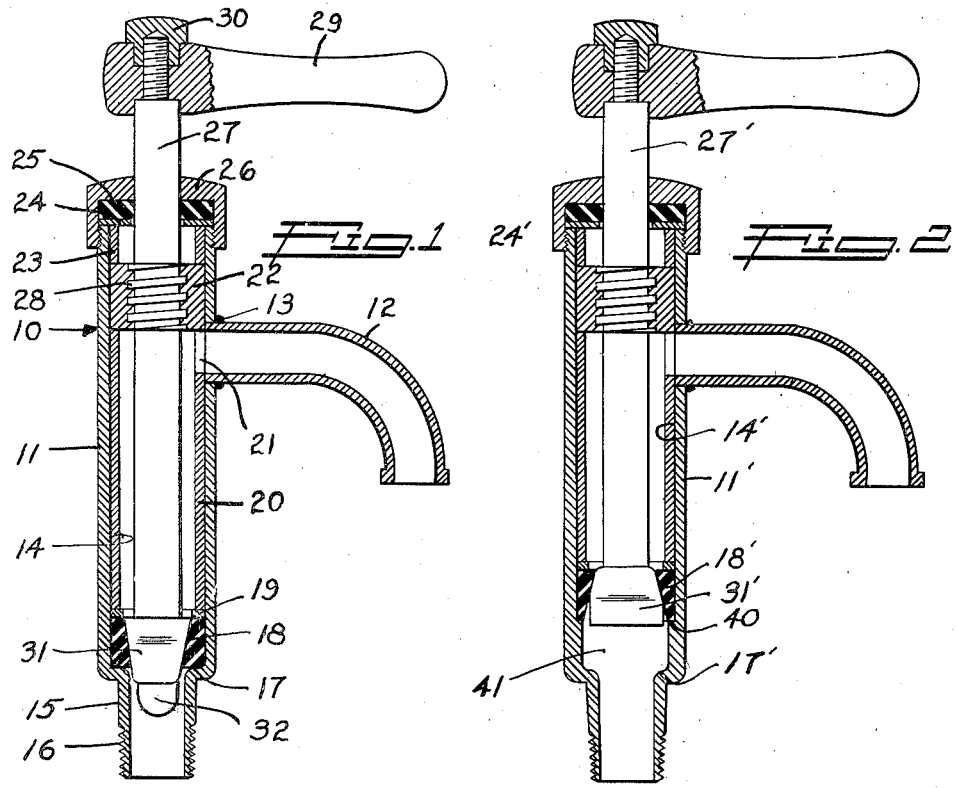
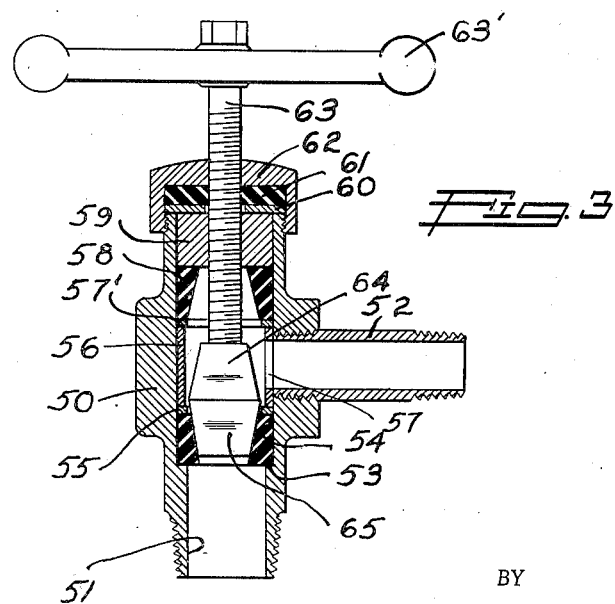
INVENTOR.
HENRY WIRZ
BY B. J. Craig,
ATTORNEY Patented Aug. 9, 1949

2,478,350

UNITED STATES PATENT OFFICE 2,478,350

VALVE

Henry Wirz, Long Beach, Calif.

Application June 23, 1944, Serial No. 541,736

2 Claims. (Cl. 251—22)

This invention relates to a valve.

The general object of the invention is to provide a valve which includes a washer or valve seat member which may be made of material such as rubber, artificial rubber, leather, lead, composition or other suitable material.

A further object of the invention is to provide a novel valve construction which will permit easy assembly and repair.

A further object of the invention is to provide a novel means for holding a valve seat member in place in the valve.

A further object of the invention is to provide a novel valve including a plurality of valve seats and valve members adapted to control flow through the valve and also to prevent leakage along the stem of the valve when the latter is open.

An additional object of the invention is to provide a novel valve seat member.

Other objects and advantages of the invention will be apparent from the following description, taken in connection with the accompanying drawings, wherein:

Fig. 1 is a central sectional view, with parts in elevation, showing my improved valve;

Fig. 2 is a view similar to Fig. 1, showing a modification, and

Fig. 3 is a view similar to Fig. 1, showing a further modification.

Referring to the drawing by reference characters, the invention of Fig. 1 is shown as embodied in a valve which is indicated generally at 10. As shown the valve includes a cylindrical body 11 having a discharge spout 12 secured thereto as by welding at 13. The body includes a bore 14 with a reduced lower portion 15 which is threaded as at 16 for attachment to a suitable source of supply of water or other material to be delivered to the valve. The portion 15 provides a shoulder 17 which is engaged by a valve seat member 18. This member may be made of any suitable material such as rubber, leather, lead, etc. The valve seat member is engaged by a washer 19 which rests upon the upper surface thereof. The washer is then in turn engaged by a tube 20 which slides within the body and which has a slot 21 through which fluid may pass to the nozzle 12.

The tube 20 is engaged by an internally threaded sleeve 22 which rests upon the upper end of the tube. Above the sleeve 22 I provide a second tube 23, the upper end of which is substantially flush with the upper end of the body 11. Upon the upper end of the body I arrange a second washer 24 which is engaged by suitable packing means 25, arranged in a packing gland 26, which threadedly engages the upper end of the body.

A valve stem 27 has threads 28 therein which engage the threads in the sleeve 22. Since the sleeve 22 is suitably held in place, as by being clamped between the tubes 20 and 23, it does not rotate, thus permitting the stem 27 to move up and down in the body when it is turned by a handle 29 thereon, which is held in place by a cap member 30.

The lower end of the stem 27 includes a valve head 31 which is in the nature of a valve member and which engages the valve seat member 18. The member 31 includes a depending bulbous pilot 32 or extension which serves to push away any material which is squeezed inwardly from the valve seat member 18 when the latter is made of soft material and thus it serves to maintain passage through the member 18 under all conditions of operation.

In assembly the valve seat member 18 may be first inserted after which the washer 19, tube 20, sleeve 22 and tube 23 may be inserted, after which the washer 24 may be arranged upon the tube, after which the gland 26, having the gasket 25 therein, is secured in place. In this assembly the stem 27 is arranged in the sleeve 22 so that placing the sleeve 22 in place also brings the valve stem into position.

In Fig. 2 I show a modification of my invention. In this figure parts similar to those previously described are designated by similarly primed reference numerals.

In the modification the body 11' is provided with a shoulder 40 which is spaced from the shoulder 17' to provide a chamber 41 into which the valve head 31' moves. This valve head 31' is arranged on the stem 27' with the largest part of the valve directed downwardly and with the side thereof tapering upwardly. In the same manner the valve seat member 18' is reversed from that shown in Fig. 1 and the construction is such that the valve head 31' moves downwardly to open and permit liquid to pass through the valve. The manner of assembly will be apparent from the description.

In Fig. 3 I show a further modification of my invention wherein the body 50 has a central bore 51 and has an outlet 52. The body includes a shoulder 53 on which a valve seat member 54 is arranged. This valve seat member is engaged by a washer 55 which is engaged by a tube 56 which has an opening 57 aligned with the outlet 52.

Above the tube 56 I arrange a second washer 57' which is engaged by a valve seat member 58 which is in turn engaged by a sleeve 59 which is internally threaded. The sleeve 59 is engaged by a washer 60 and the latter is engaged by a packing member 61 in a packing gland 62.

The further modification includes a valve stem 63, rotatable by a suitable handle 63' at its upper end. The valve stem 63 is threaded to engage threads on the collar 59. At its lower end the stem is provided with a valve head member which includes an upper portion 64 and a lower portion 65, suitably held upon the stem 63. The valve head upper portion 64 tapers upwardly to fit a corresponding taper on the seat member 58 while the valve head lower portion 65 tapers downwardly to fit a corresponding taper on the seat member 54.

The valve head portion 65, when the parts are in the position shown in Fig. 3, prevents passage upwardly in the body bore 51 to the outlet 52. When the handle 63' is rotated and the valve stem 63 is raised, the valve head 64 will engage the valve seat member 58 and when in this position will prevent leakage along the stem 63 of the valve.

The valve shown in Fig. 3 is particularly adapted to use such as in air lines, service stations wherein the valve is connected by the outlet 52 to a tire inflating device. With the ordinary valve, leakage has frequently occurred along the stem 63 but with my construction the operator, by rotating the handle 63', can cause the valve head 64 to engage the valve seat member 58 and thus prevent leakage along the stem 63. Thus gradual loss of compressed air will not occur with my construction.

It will be understood that the valve shown in Fig. 3 as well as the other valves are adapted for a wide range of uses in connection with controlling flow of various fluids.

From the foregoing description it will be apparent that I have invented a novel valve which is extremely simple in construction, can be easily assembled and easily repaired, and which is not likely to get out of order.

Having thus described my invention, I claim:

1. A valve construction including a body having a bore and having a discharge opening communicating with the bore intermediate the length of the body, said body having an inlet and having a shoulder adjacent said inlet, a removable valve seat engaging said shoulder, a washer engaging the upper end of said valve seat, a tube in said body and engaging the upper end of said washer, a second washer engaging the upper end of said tube, a second valve seat engaging said second washer, a sleeve engaging the upper end of said second valve seat, a third washer engaging the upper end of said sleeve, packing means engaging said third washer, a packing gland threadedly engaging the body end, said packing means and said packing gland having bores therethrough, a valve stem shiftable in said last mentioned bores, means to shift said valve stem, said tube having an aperture aligned with said discharge nozzle, said valve stem having spaced valve means thereon for selectively engaging said valve seats.

2. A valve construction including a body having a bore therethrough and having a discharge spout communicating with the bore intermediate the length of the body, said body having an inlet and having a shoulder adjacent said inlet, a removable valve seat member engaging said shoulder, said valve seat member having a planar top and having a tapered seat coaxial with the bore of said body, a washer engaging the upper end of said valve seat member, a tube in said body and engaging the upper end of said washer, a second washer engaging the upper end of said tube, a second valve seat member engaging said second washer, an internally threaded sleeve engaging the upper end of said second valve seat member, a third washer engaging the upper end of said sleeve, packing means engaging said third washer, a packing gland threadedly engaging the body end, said packing means and said packing gland having bores therethrough, a valve stem shiftable in said bores, said valve stem having a threaded portion fitting the threads on said sleeve, and means to rotate said valve stem, said tube having an aperture aligned with said discharge nozzle, said valve stem having spaced valve means thereon for selectively engaging said valve seat members.

HENRY WIRZ.

REFERENCES CITED

The following references are of record in the file of this patent:

UNITED STATES PATENTS

| Number | Name | Date |
|---|---|---|
| 444,782 | Moran | Jan. 13, 1891 |
| 507,661 | Langford | Oct. 31, 1893 |
| 1,436,768 | Mackie | Nov. 28, 1922 |
| 1,782,758 | Gavin | Nov. 25, 1930 |
| 1,884,207 | Pollock | Oct. 25, 1932 |

FOREIGN PATENTS

| Number | Country | Date |
|---|---|---|
| 103,281 | Switzerland | 1924 |